UNITED STATES PATENT OFFICE.

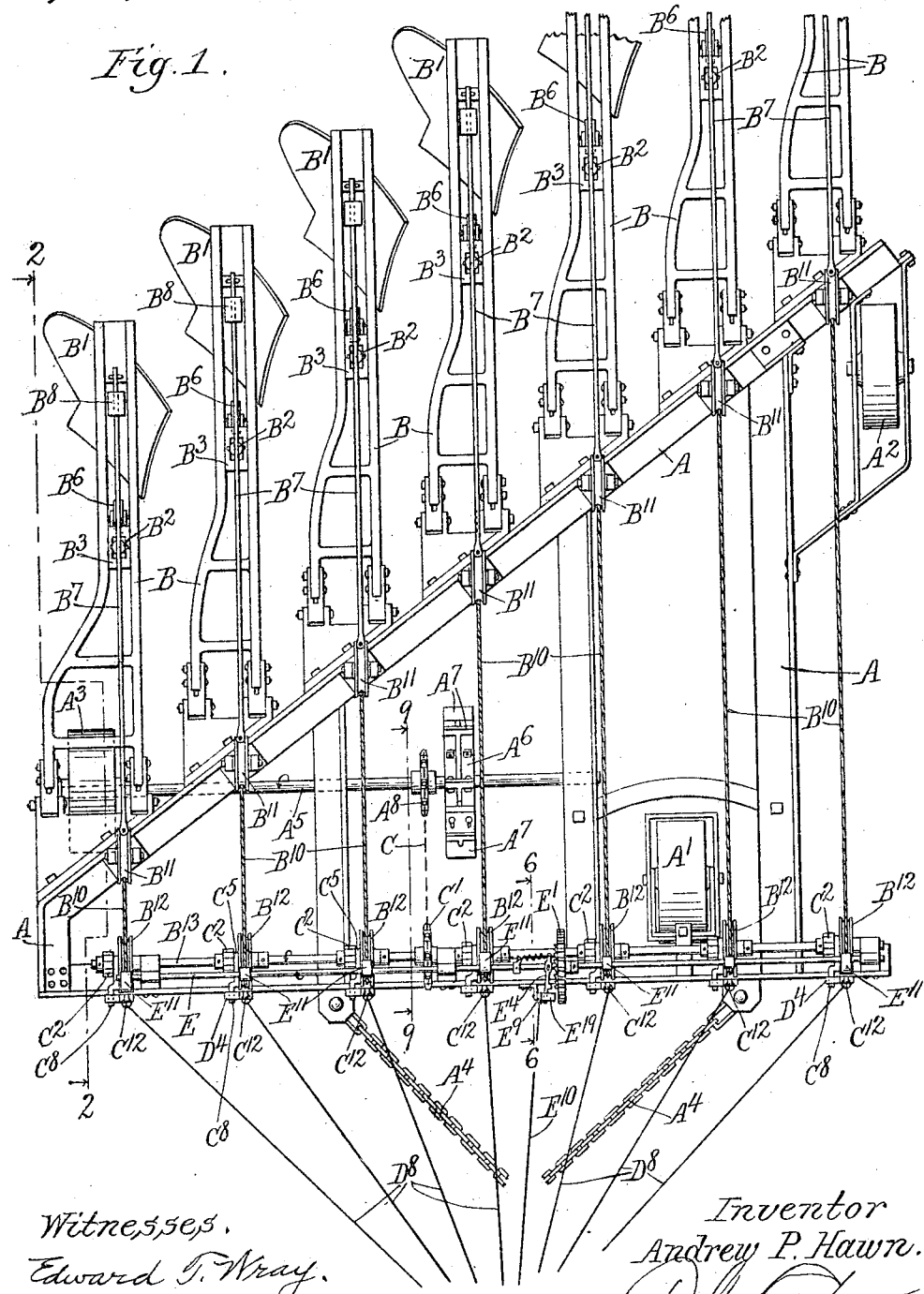

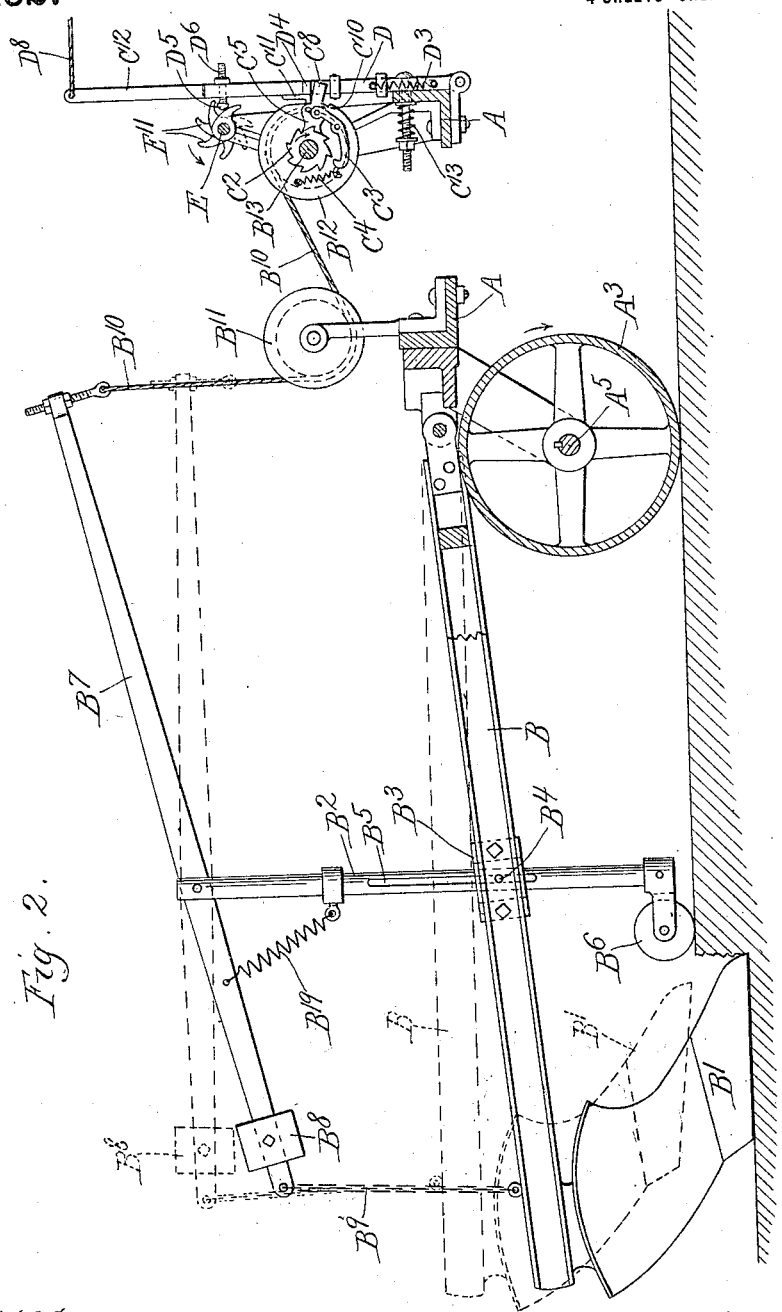

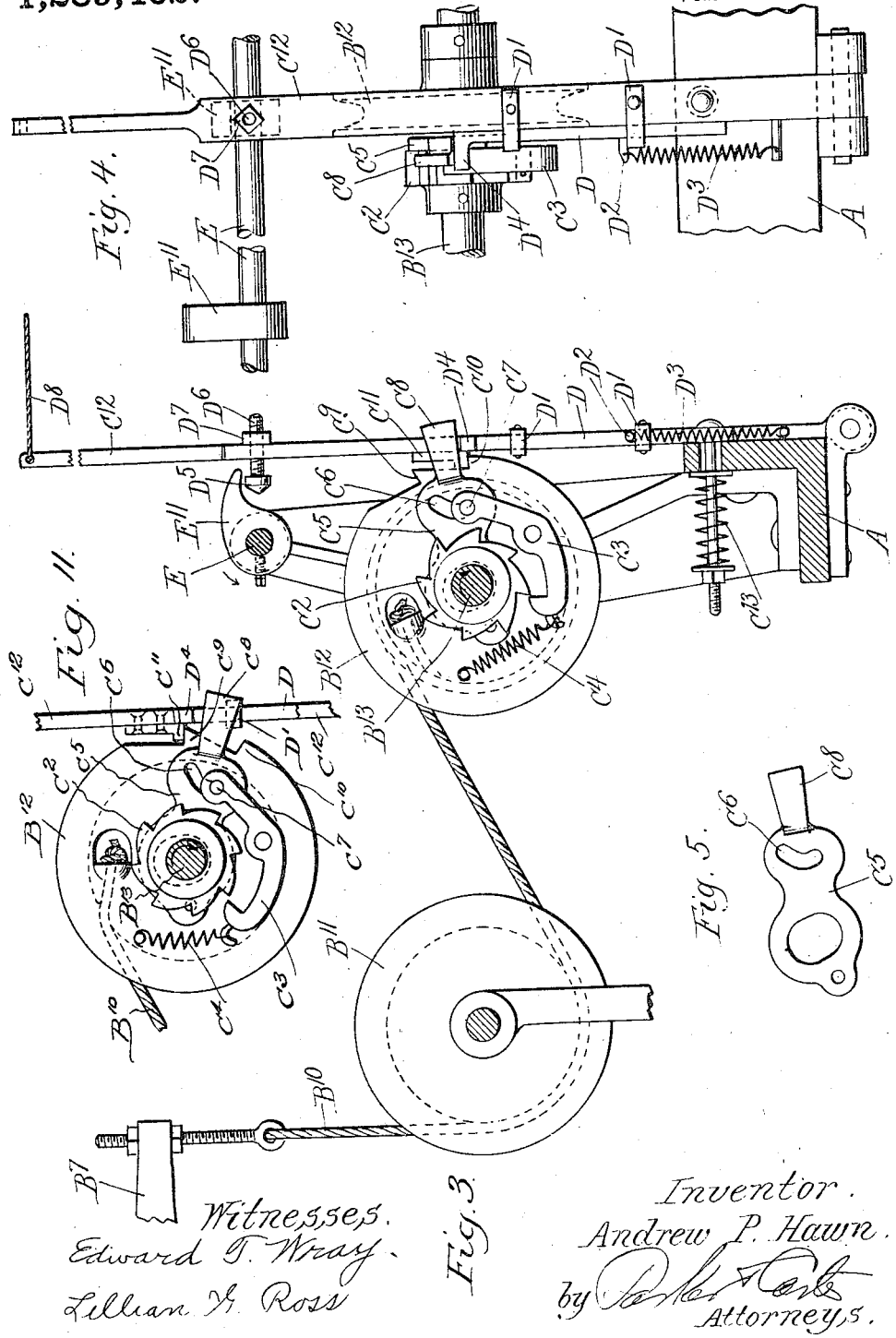

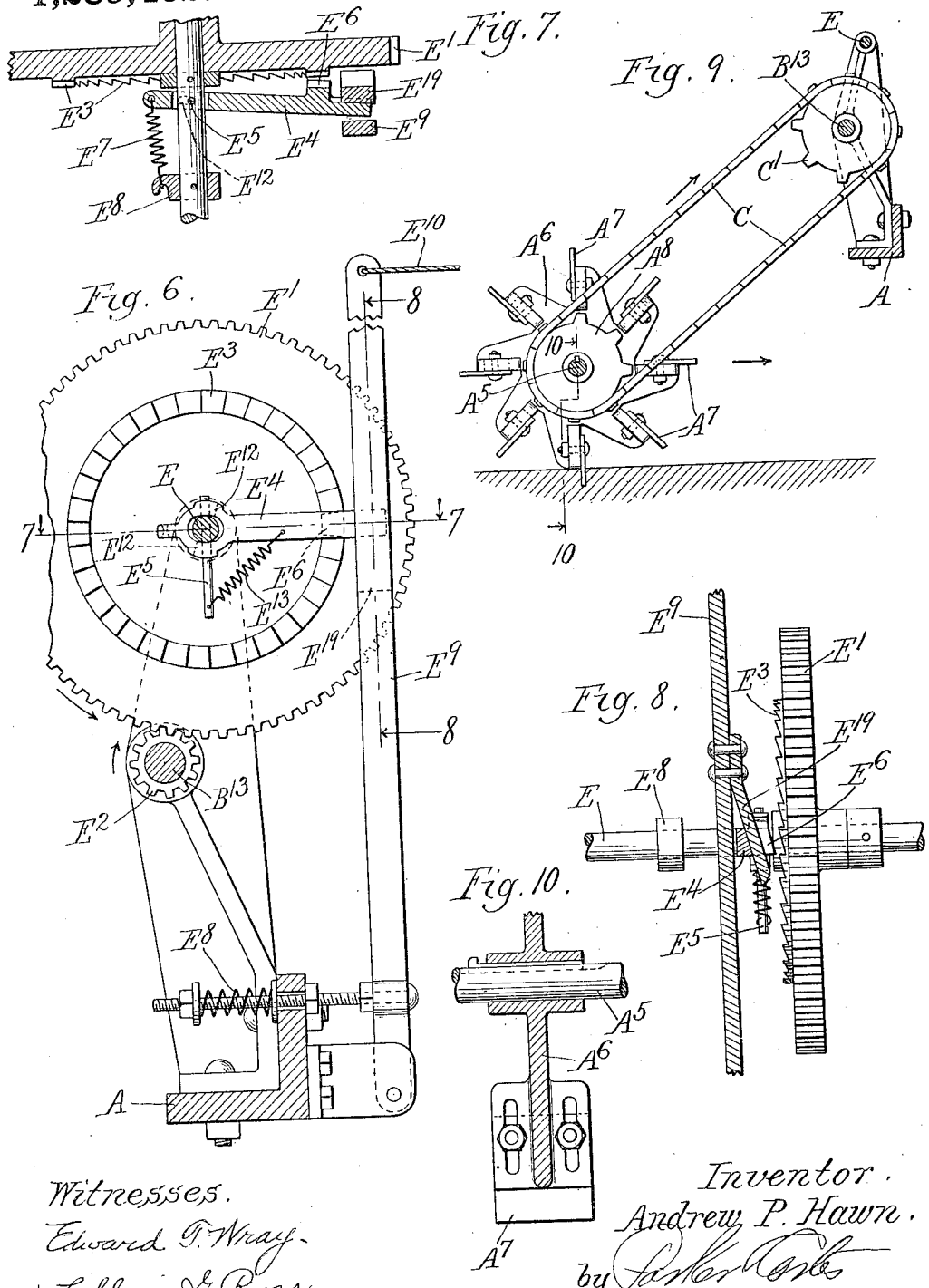

ANDREW P. HAWN, OF LAPORTE, INDIANA, ASSIGNOR, BY DIRECT AND MESNE ASSIGNMENTS, TO ADVANCE-RUMELY COMPANY, OF LAPORTE, INDIANA, A CORPORATION OF INDIANA.

GANG-PLOW.

1,289,462.   Specification of Letters Patent.   Patented Dec. 31, 1918.

Application filed September 23, 1912, Serial No. 721,746. Renewed January 5, 1918. Serial No. 210,575.

*To all whom it may concern:*

Be it known that I, ANDREW P. HAWN, a citizen of the United States, residing at Laporte, in the county of Laporte and State of Indiana, have invented a certain new and useful Improvement in Gang-Plows, of which the following is a specification.

My invention relates to improvements in gang plows and is illustrated diagrammatically in the accompanying drawings wherein—

Figure 1 is a plan view;

Fig. 2 is a section along line 2—2 of Fig. 1;

Fig. 3 is a detail side elevation with parts in section on a large scale of the hoisting mechanism shown in Fig. 2 in a lifting position;

Fig. 4 is a front elevation of the hoisting mechanism shown in Fig. 3;

Fig. 5 is a detail side elevation of the latch shown in Fig. 3;

Fig. 6, a section along line 6—6 of Fig. 1;

Fig. 7, a section along line 7—7 of Fig. 6;

Fig. 8, a section along line 8—8 of Fig. 6; and

Fig. 9, a section along line 9—9 of Fig. 1.

Fig. 10, a section along line 10—10 of Fig. 9.

Fig. 11 is a detail figure similar to a part of Fig. 3, but showing the pulley $B^{12}$ in its alternative position, with the tooth $C^9$ engaging the block $C^{11}$.

The triangular plow frame A is supported upon the wheels $A^1$ $A^2$ $A^3$. The chain or traction connection $A^4$ leads from the front edge of the plow frame to any suitable traction device. The shaft $A^5$ upon which is keyed the wheel $A^3$ is rotatably mounted on the frame A and carries keyed thereon the paddle wheel $A^6$ having the paddles $A^7$ which may be adjusted to penetrate and grip the ground and give traction. The sprocket $A^8$ is keyed to the shaft $A^5$.

The plow beams B are pivoted each to the inclined rear member of the plow frame and carry the plows $B^1$. $B^2$ $B^2$ are vertical rods slidable through the blocks $B^3$ $B^3$ in the beams B and limited in their movement by the pin $B^4$ engaging the slot $B^5$. The ground casters $B^6$ on the lower ends of the rods $B^2$ support them from the ground. The levers $B^7$ are pivoted at the upper ends of the rods $B^2$ having at their outer ends the weights $B^8$, and are connected by means of the chain $B^9$ to the plow beams B. The springs $B^{19}$ interposed between the levers $B^7$ and the rods $B^2$ yieldingly draw the levers downward as indicated. The ropes or cables $B^{10}$ pass from the inward ends of the levers $B^7$ over the pulleys $B^{11}$ on the plow frame A to the winding drums or sheaves $B^{12}$ rotatably mounted on the shaft $B^{13}$. The shaft $B^{13}$ is driven responsive to the rotation of the shaft $A^5$ by the sprocket chain C passing over the sprocket $A^8$ on the shaft $A^5$ and the sprocket $C^1$ on the shaft $B^{13}$.

The shaft $B^{13}$ has thereon the ratchet wheels $C^2$ equal in number to the sheaves or pulleys $B^{12}$ and so arranged that one ratchet wheel is immediately adjacent each of the sheaves. The dogs $C^3$ pivotally mounted on the sheaves $B^{12}$ are in opposition to the ratchet wheel $C^2$ and yieldingly pressed thereagainst by the springs $C^4$. The latch members $C^5$ are pivoted on the pulleys $B^{12}$ and have the cam grooves $C^6$ therein to engage the pin $C^7$ of the dog $C^3$ and have the outwardly projecting controlling fingers $C^8$. The cables $B^{10}$ are wound about the pulleys $B^{12}$ and rigidly attached at their end thereto as indicated in Fig. 3. The pulleys $B^{12}$ have at one point in their periphery the two ratchet teeth $C^9$ $C^{10}$ adapted to be engaged by the block $C^{11}$ on the lever $C^{12}$, which lever is pivotally mounted on the frame and yieldingly forced toward the pulley $B^{12}$ by the spring $C^{13}$.

It will be noted that the latch member $C^5$ is frictionally held in that position to which it has been moved by the pressure against the finger $C^8$, and therefore when the member $C^5$ is in the position indicated in Fig. 3 there will be no tendency for it to move and permit the dog $C^3$ to engage the ratchet $C^2$ in response to the tension of the spring $C^4$, and it is only when the latch is moved so as to bring the tooth $C^7$ into the upper portion of the slot $C^6$ that the spring $C^4$ is free to draw the dog into connection with the ratchet.

The rod D is slidably mounted on the lever $C^{12}$, being held in position thereon by the clips $D^1$, and is provided with the lug $D^2$ adapted to be yieldingly held against the lower clip $D^1$ by the spring $D^3$ and has at its upper end the contact lug $D^4$ in opposition to the controlling finger $C^8$. The tappet member $D^5$ is mounted on the screw $D^6$ adjustable in the lever $C^{12}$ and adapted to be locked in position by the nut $D^7$. The cables $D^8$ lead from the upper ends of the lever $C^{12}$ to the operator's stand, so that by pulling on one of the cables he may instantly trip it to raise or lower the desired plow as below described.

I will now describe the means whereby the operator can by one movement so operate the device that the plows will automatically be raised successively from the ground thus leaving the straight ended furrow.

The shaft E is rotatably mounted on the frame A and carries the gear $E^1$ rotatably mounted thereon. The gear $E^1$ is in mesh with the pinion $E^2$ of the shaft $B^{13}$. The ratio of the gear to the pinion is such that the pinion $E^2$ will make as many revolutions for one revolution of the gear $E^1$ as there are plows on the frame. The gear $E^1$ carries on its face the flat ratchet gear $E^3$. The lever $E^4$ is pivoted on the pin $E^5$ in the shaft E and is therefore free to swing in a plane containing the shaft but compelled to rotate with it. This lever carries the tooth $E^6$ in opposition to the ratchet tooth $E^3$ and is provided with the tension spring $E^7$ located between the free end of the lever $E^4$ and the collar $E^8$ on the shaft E to yieldingly bring the tooth $E^6$ into engagement with the ratchet gear $E^3$. The lever $E^9$ is pivotally mounted on the frame E being held yieldingly inward by the spring $E^8$ and carries the outwardly inclined finger $E^{19}$ projecting into the path of the lever $E^4$ when in the inward position. The cable $E^{10}$ extends from the upper end of the lever $E^7$ to the operating station. The shaft E carries the cams $E^{11}$ angularly spaced in opposition to the tappets $D^5$ in such manner that when the shaft E rotates it causes the cams $E^{11}$ to strike successive tappets $D^5$ and throw successive levers $D^{12}$ thus successively actuating the plow raising mechanism.

It will be noted that the entire apparatus is driven when tripped or thrown in by the operator responsive to and at a direct speed relation to the forward movement of the plow frame and thus when the tripping shaft E is rotated it, by means of the cams thereon, throws the successive plow lift controlling levers at such times that the plows are successively raised to end their furrows all at a common line at right angles to the furrow, thus giving the desired straight ended furrow.

It will be evident that while I have shown in my drawings an operative device, still many changes might be made in size, shape and arrangement of parts without departing materially from the spirit of my invention. I wish, therefore, that my drawings be regarded as in a sense diagrammatic.

The use and operation of my invention are as follows:

Starting with the plows all in the ground and the gang plow moving forwardly driven by any suitable tractor means, the operator will control the plows in the following manner:

If he wishes to raise a single plow, the mechanism being in the position shown in Fig. 11 he will pull on the cord leading to the appropriate plow lever $C^{12}$. This will pull the lever back away from the pulley $B^{12}$ thus freeing the pulley which previously has been held against rotation by the member $C^{11}$ on the lever engaging the notch $C^9$ therein. The weight on the end of the plow lifting fulcrumed lever $B^7$ will pull it down drawing up on the hoisting cable and throwing the finger $C^8$ on the latch $C^5$ against the spring held finger $D^4$ or lug on the lever $C^{12}$. This will throw the latch over permitting the pin on the dog to move into the outermost portion of the cam slot $C^6$ and permitting the spring $C^4$ to draw the dog $C^3$ into engagement with the ratchet $C^2$ which is constantly moving in response to the forward movement of the plow. The pulley $B^{12}$ will then rotate with the dog $C^3$, ratchet $C^2$ and shaft $B^{13}$ making an approximately complete revolution to lift the plow. When this complete revolution has been made, the finger $C^8$ on the latch $C^5$ will come in contact with the spring held finger $D^4$ or lug slidable on the lever $C^{12}$ and this will throw the dog $C^3$ out of engagement with the ratchet $C^2$, since the position of the latch with respect to the pulley and dog will be changed to bring the pin $C^7$ on the dog into the near end of the cam slot $C^6$. Meanwhile, the spring-held operating lever $C^{12}$ will have been pressed inwardly to permit the member $C^{11}$ thereon to engage the tooth $C^{10}$ in the pulley $B^{12}$ and the plow will thus be held out of the ground, the hoisting means being free from the strain laid on the shaft by virtue of the latch holding the dog out of engagement with the ratchet.

When the operator wishes to drop the plow, he merely pulls on the cord $D^8$ leading to the lever $C^{12}$ thus disconnecting the tooth $C^{10}$ of the pulley $B^{12}$ and the block $C^{11}$ on the lever permitting the plow to drop until the tooth $C^9$ comes into engagement with the member $C^{11}$ without in any way affecting the remainder of the apparatus and leaving it in such position as to be ready for another lifting movement.

If, however, the operator wishes to operate the plows so that they will successively rise, he pulls a single cable leading to the separate controlling lever. This pulls the inclined arm out from under the ratchet lever on the upper shaft and permits the teeth of the ratchet lever to engage the ratchet wheel, thus putting the upper or controlling shaft into rotation. As this shaft rotates, the cams carried thereabout successively come into contact with the tappets on the raising or plow controlling levers and throw them successively at the proper times in exactly the same way as if the operator had pulled the controlling cords. The plows will then be successively raised from the ground and locked in the upper position. The main controlling lever will meanwhile have sprung back to its normal position, and when the latch lever comes around the pulley it slides upward into the inclined arm and the movement of the hoisting shaft will cease.

When the operator wishes again to lower the plows he pulls on the hoisting cord again putting into operation the hoisting shaft which in turn drops the successive levers at the proper time, thus returning the plows and hoisting mechanism to their original position and leaving them ready for another cycle of operation at the proper time.

I claim:

1. A gang plow comprising a plow frame, plows carried thereby, means comprising a constantly rotating shaft and a connection between said shaft and each individual plow for raising individual plows at the will of the operator and means for successively completing the connection between each of the plows and the rotating shaft to successively raise the plows said means comprising a shaft and means for causing it to rotate in response to the rotation of the constantly moving shaft at such velocity that it makes one revolution while the constantly moving shaft makes as many revolutions as there are plows to be raised.

2. A hoisting means for plows and the like comprising a constantly rotating shaft, a ratchet wheel thereon, a pulley rotatably mounted thereon, a dog mounted on said pulley in opposition to said ratchet wheel, a latch to control said dog, an actuating finger projecting outwardly from said latch, a controlling lever having a part projecting into the path of said finger, teeth on said pulley, a lock member carried by said lever projecting into the path of said teeth, said lever being yieldingly pressed toward said pulley into the path of said teeth and said finger, means for manually operating said lever to free said latch and said pulley and automatic means for operating said lever for the same purpose.

3. A gang plow comprising a plow frame, plows carried thereby, means comprising a constantly rotating shaft and a connection between said shaft and each individual plow for raising individual plows at the will of the operator and means for successively completing the connection between each of of the plows and the rotating shaft to successively raise the plows, said means comprising a shaft and means for causing it to rotate in response to the rotation of the constantly moving shaft.

In testimony whereof, I affix my signature in the presence of two witnesses this 18th day of September, 1912.

ANDREW P. HAWN.

Witnesses:
LILLIAN G. ROSS,
MINNIE SUNDFAR.

Copies of this patent may be obtained for five cents each, by addressing the "Commissioner of Patents, Washington, D. C."